Figure 1:
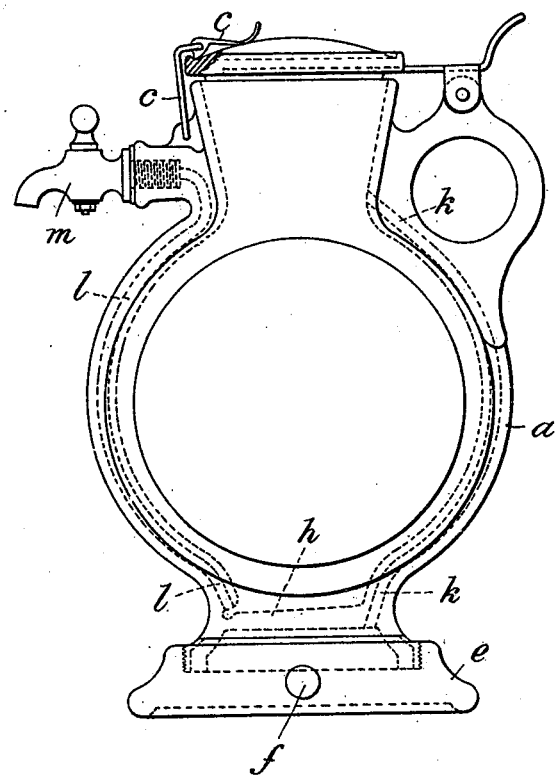

No. 647,964. Patented Apr. 24, 1900.
A. HEINEMANN.
SIPHON VESSEL FOR BEER.
(Application filed Dec. 12, 1899.)

(No Model.)

WITNESSES:

INVENTOR
Albert Heinemann
BY
Richardson
ATTORNEYS

THE NORRIS PETERS CO., PHOTO-LITHO., WASHINGTON, D. C.

UNITED STATES PATENT OFFICE.

ALBERT HEINEMANN, OF BERLIN, GERMANY.

SIPHON VESSEL FOR BEER.

SPECIFICATION forming part of Letters Patent No. 647,964, dated April 24, 1900.

Application filed December 12, 1899. Serial No. 740,096. (No model.)

*To all whom it may concern:*

Be it known that I, ALBERT HEINEMANN, merchant, a subject of the Emperor of Germany, and a resident of No. 12 Reichstagsufer, Berlin, in the Empire of Germany, have invented a certain new and useful Improved Siphon Vessel for Beer and the Like, of which the following is an exact, full, and clear description.

This invention relates to a siphon vessel for beer and the like according to which there is provided in the chamber between the liqquid-surface and the usual lid of the vessel, which is hinged and can thus be easily opened and closed, carbonic acid under pressure, so that it is impossible for the liquid to come in contact with air. The vessel is filled by means of the known bottling apparatus in such a manner that the air of the vessel is first driven out by the carbonic acid, then the beer is poured into the vessel, and finally carbonic acid is pressed after same, so that on account of the vessel being provided with a cover which can be quickly closed carbonic acid remains in the space above the liquid-surface. The siphon vessel is emptied also by compressed carbonic acid, which acts on the liquid-surface and according to the invention is contained in a receptacle provided with a filling-hole and a pressure-reducing valve, such receptacle being in the form of a bottom attachment of the vessel. For allowing of the emission of the liquid and the admission of the compressed carbonic acid above the liquid-surface the siphon vessel is provided in its walls or sides with two channels or two pipes, which allow of the free movement of the hinged lid forming the stopper for the siphon vessel. The channel feeding the carbonic acid from the bottom attachment passes through the bottom of the siphon vessel and extends into the free space below the lid of the former, while the channel through which the liquid issues communicates with the interior of the siphon vessel at the bottom of the same and leads to a cock or any other suitable cut-off device provided on the exterior of the siphon. This construction of the siphon vessel has for the practical use of the same the essential advantage that the lid does not come in contact with those parts which, especially when cleaning and filling, may be easily damaged or may impede the easy handling—as, for instance, the pressure-reducing or back-pressure valve—since these parts are arranged on the carbonic-acid receptacle forming the bottom piece or attachment of the siphon and securely provided in the chamber or space between the said bottom attachment and the bottom of the siphon vessel, so that they cannot be deranged. This construction is also especially advantageous and essential from a hygenic point of view in so far as it is impossible for the contents of the siphon to come in contact with any metal parts, since the lid is preferably made of the same material as the siphon.

Figure 2:
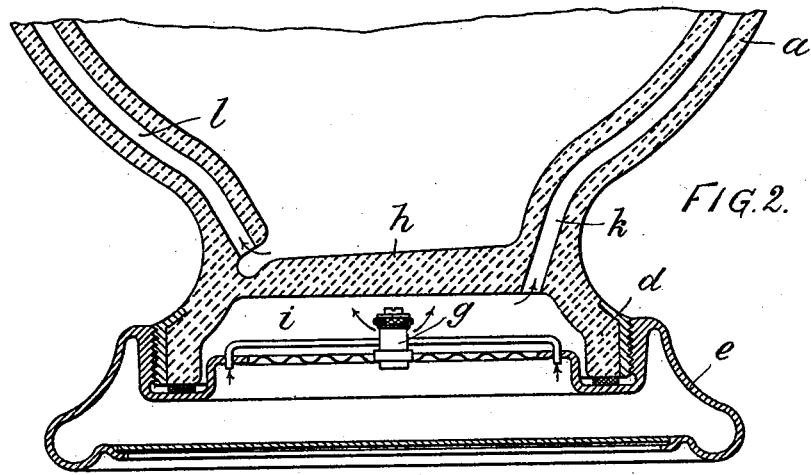

Referring to the accompanying drawings, Figure 1 is a side elevation of the siphon vessel; and Fig. 2 is a vertical section, drawn on a larger scale, through the bottom part of the vessel, with bottom attachment for the compressed carbonic acid.

The siphon vessel $a$, of any suitable shape, is closed by a lid or cover $b$, provided with the usual hinge, so as to be easily and quickly opened and closed. The said lid is kept in a closed position by a suitable or known locking device $c$.

At the bottom part $d$ of the siphon is securely mounted a receptacle $e$, preferably consisting of metal, which is adapted to receive compressed carbonic acid and is provided with a filling-hole $f$ and pressure-reducing valve $g$ of suitable known construction. Between the receptacle $e$ and the bottom $h$ of the vessel there is a free space $i$, in which the carbonic acid is forced with certain pressure reduced through the valve $g$. This chamber $i$ communicates with the free space between the lid $b$ and the surface of the liquid in the siphon through a channel $k$, located in the side of the siphon or through a suitable pipe not connected to the lid $b$, so that the compressed carbonic acid is fed from the receptacle $e$ into this space above the liquid and presses upon the liquid-surface. The liquid is likewise discharged through a channel $l$, located in the side of the siphon, such channel extending with its lower end within the siphon above the bottom $h$, preferably inclined toward the outlet of the channel and leading to a cock or other cut-off device $m$, provided on the exterior of the siphon, through whose (cut-off device) opening the liquid is conveyed from the vessel by the pressure of the carbonic acid.

The bottom attachment e is of such dimensions that the carbonic acid contained therein under suitable pressure is sufficient for emptying the whole contents of the siphon vessel.

Having now particularly described and ascertained the nature of the said invention, I declare that what I claim, and wish to secure by Letters Patent, is—

1. In combination with a vessel, a filling-opening therein, a gas-chamber located below the bottom of the vessel, a passage leading directly through one side wall of the vessel from the gas-chamber to the upper part of the interior of the vessel, a second passage leading directly through the wall of the vessel from the interior of the bottom part of the same to the upper part of the exterior of the same, and a cock located at the discharge end of the latter passage, substantially as described.

2. The combination of a vessel having a fluid-chamber and a flanged bottom forming a recess, a casing secured to said flange and having its upper side closing said recess and forming intermediate and lower chambers, an inlet from the lower chamber in said casing leading into said intermediate chamber formed by said recess, a passage from said intermediate chamber to the chamber in the vessel, and an outlet from the vessel, substantially as described.

In witness whereof I have hereunto set my hand in presence of two witnesses.

ALBERT HEINEMANN.

Witnesses:
WOLDEMAR HAUPT,
HENRY HASPER.